US010645363B2

(12) United States Patent
Van Der Zwan et al.

(10) Patent No.: US 10,645,363 B2
(45) Date of Patent: May 5, 2020

(54) IMAGE-BASED EDGE MEASUREMENT

(71) Applicant: LEICA GEOSYSTEMS AG, Heerbrugg (CH)

(72) Inventors: Elmar Vincent Van Der Zwan, Altstätten (CH); Tobias Heller, Rebstein (CH); Siegfried Wiltsche, Wolfurt (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 16/196,307

(22) Filed: Nov. 20, 2018

(65) Prior Publication Data
US 2019/0158806 A1    May 23, 2019

(30) Foreign Application Priority Data
Nov. 20, 2017    (EP) ..................... 17202639

(51) Int. Cl.
*H04N 13/204*    (2018.01)
*G06T 7/60*    (2017.01)
(Continued)

(52) U.S. Cl.
CPC ......... *H04N 13/204* (2018.05); *G01B 11/028* (2013.01); *G01C 11/06* (2013.01);
(Continued)

(58) Field of Classification Search
CPC ...... H04N 13/204; H04N 5/232; G06T 7/579; G06T 7/60; G01B 11/028; G01C 11/06;
(Continued)

(56) References Cited

U.S. PATENT DOCUMENTS 6,760,117 B2    7/2004    Slatter
7,293,368 B1 *  11/2007   Faulk ..................... G01C 11/00
                                                  33/194
(Continued)

FOREIGN PATENT DOCUMENTS

DE    10 2013 202658 A1    8/2014
EP        2 918 972 A2     9/2015

OTHER PUBLICATIONS

"Box dimension measurement 4 using Tara—Stereo Camera", e-con Systems, accessed at URL:https://www.youtube.com/watch?v=DPpQ03, Published on Jul. 12, 2016, pp. 2.
(Continued)

*Primary Examiner* — John R Schnurr
(74) *Attorney, Agent, or Firm* — Maschoff Brennan

(57) ABSTRACT

A method for an image-based measurement of a scene using a handheld apparatus, including a recording of at least one first image and one second image of the scene by at least one camera of the apparatus, a photogrammetric evaluating of the first and the second image, and a graphic outputting of an image representation of the scene on a display unit, characterized by an automatically proceeding edge measurement functionality, as part of which, in each case without user intervention, edges in the scene are identified utilizing at least one image of the scene, edge lengths of the identified edges are ascertained based on the photogrammetrically evaluated images, and the ascertained edge lengths are displayed in the image representation of the scene.

15 Claims, 6 Drawing Sheets

(51) Int. Cl.

| | | |
|---|---|---|
| *G06T 7/579* | (2017.01) | |
| *G01C 11/06* | (2006.01) | |
| *G01B 11/02* | (2006.01) | |
| *G01S 17/08* | (2006.01) | |
| *G06F 1/16* | (2006.01) | |
| *G06F 3/0484* | (2013.01) | |
| *G06K 9/00* | (2006.01) | |
| *H04N 5/232* | (2006.01) | |
| *G06F 3/0488* | (2013.01) | |

(52) U.S. Cl.
CPC ............ *G01S 17/08* (2013.01); *G06F 1/1686* (2013.01); *G06F 3/04845* (2013.01); *G06K 9/00664* (2013.01); *G06T 7/579* (2017.01); *G06T 7/60* (2013.01); *H04N 5/232* (2013.01); *G06F 3/04883* (2013.01); *G06F 2203/04806* (2013.01)

(58) Field of Classification Search
CPC . G01S 17/08; G06K 9/00664; G06F 3/04883; G06F 2203/04806; G06F 1/1686; G06F 3/04845
See application file for complete search history.

(56) References Cited

U.S. PATENT DOCUMENTS

| | | | | |
|---|---|---|---|---|
| 8,868,375 | B1* | 10/2014 | Christian | G01C 21/206 33/228 |
| 9,129,404 | B1* | 9/2015 | Wagner | G06T 11/00 |
| 9,470,792 | B2 | 10/2016 | Giger | |
| 2010/0315412 | A1* | 12/2010 | Sinha | G06T 15/00 345/419 |
| 2015/0187091 | A1* | 7/2015 | Hata | G01B 11/02 382/101 |
| 2015/0317070 | A1 | 11/2015 | Lammers Van Toorenburg et al. | |
| 2016/0012611 | A1* | 1/2016 | Wexler | G06T 7/62 382/103 |
| 2016/0086322 | A1* | 3/2016 | Arita | E01B 35/02 382/154 |
| 2016/0139774 | A1 | 5/2016 | Rivard et al. | |
| 2016/0188955 | A1* | 6/2016 | Michaelraj | G06K 9/00214 382/154 |
| 2016/0189386 | A1* | 6/2016 | Michaelraj | G06T 7/13 382/154 |
| 2016/0239976 | A1* | 8/2016 | Fathi | G06T 7/579 |
| 2016/0292888 | A1* | 10/2016 | Arita | G01B 11/24 |
| 2017/0039731 | A1* | 2/2017 | Liu | G06T 7/60 |
| 2018/0075168 | A1* | 3/2018 | Tiwari | G06F 17/5004 |
| 2018/0218513 | A1* | 8/2018 | Ho | G06T 7/73 |
| 2019/0155302 | A1* | 5/2019 | Lukierski | G06T 17/00 |
| 2019/0158811 | A1* | 5/2019 | Van Der Zwan | G01C 3/14 |

OTHER PUBLICATIONS

European Search Report dated Aug. 13, 2018 as received in Application No. EP 17 20 2639.

"Measuring & Tracking of Boxes in Real-Time," CurvSurf, accessed at https://www.youtube.com/watch?v=mEHaR2mjm9c, Published on Jun. 20, 2015, pp. 2.

* cited by examiner

IMAGE-BASED EDGE MEASUREMENT

CROSS-REFERENCE TO RELATED APPLICATIONS

This application claims priority to European Patent Application No. 17202639.5, filed on Nov. 20, 2017. The foregoing patent application are incorporated herein by reference.

FIELD OF INVENTION

The present invention relates to a method for the automatic image-based edge measurement and a handheld photogrammetry apparatus for performing such a method.

BACKGROUND

Apparatuses and methods for photogrammetric image recording are known in principle in the prior art and are used in a wide range of applications to perform measurements in images, that is to say in particular to ascertain dimensions in an image, for example of distances between imaged features.

By way of example, EP 2 918 972 A2 shows a method and a corresponding portable device for creating a spatial model using stereo-photogrammetry.

U.S. 2015/0317070 A1 describes a portable device having a single camera and a laser rangefinder, with which image-based measurements can be performed.

Such portable devices typically have display units for presenting a recorded scene. It is here frequently possible, for example using a touchscreen, to mark points in the image of the scene so as to be able to calculate and present a distance of the points in the scene. Accurate 3D measurements, for example of edges, can thus be performed in the image and 3D models can be created, at least in theory. In practice, however, this is often difficult in particular for laypersons and inexperienced users.

SUMMARY

It is therefore an object of some embodiments of the present invention to provide an improved apparatus and an improved method for the image-based measurement of a scene.

It is in particular an object of some embodiments to provide an apparatus and a method of a type that can be used to more simply, more quickly and more accurately ascertain the lengths of edges in the scene, in particular in a reproducible manner independently of a qualification of a user and in particular with consistent accuracy.

It is a further object to provide an apparatus and a method of the type that is operable by hand simply and intuitively for an inexperienced user.

At least one of these objects is achieved by realizing the characterizing features of the independent claims. Advantageous refinements of the invention can be found in the respectively dependent claims.

A first aspect of some embodiments of the invention relates to a method for the image-based measurement of a scene using a handheld apparatus. This method includes a recording of at least one first image and one second image of the scene by at least one camera of the apparatus, wherein the first image and the second image have an overlapping image region, a photogrammetric evaluating of the first and the second image, and a graphic outputting of an image representation of the scene on a display unit. In accordance with the invention, the method additionally has an automatically proceeding edge measurement functionality, as part of which edges in the scene are identified, without user intervention, utilizing the images of the scene in each case, edge lengths of the identified edges are ascertained based on the photogrammetrically evaluated images, and the ascertained edge lengths are displayed in the image representation of the scene.

According to an embodiment of the method, edges, which are identified as part of the edge measurement functionality, in the image representation of the scene are graphically highlighted, for example marked in color.

In accordance with a further embodiment, the method comprises a stereoscopic recording of a first image of the scene by a first camera of the apparatus and of a second image of the scene by a second camera of the apparatus, wherein the first image and the second image have an overlapping image region, and a stereo-photogrammetric evaluating of the first and the second image. Utilizing the images of the scene recorded by both cameras, edges in the scene are identified and edge lengths of the identified edges are ascertained based on the stereo-photogrammetrically evaluated images.

In another embodiment, the method comprises a distance measurement to at least one surface of the scene, in particular at the same time as the recording of one or more images (for example stereoscopically recorded images), wherein a measured distance is taken into account during the (stereo-) photogrammetric evaluation, in particular for scaling purposes.

In another embodiment, the ascertaining of the length of an edge comprises an identifying of two end points of the edge and an ascertaining of a distance between the two end points using photogrammetry or stereo-photogrammetry.

According to a further embodiment of the method, the (stereo-) photogrammetric evaluating of the first and of the second image comprises a generating of a 3D model of the scene, in particular in the form of a point cloud. For ascertaining the length of an edge that has been identified in the images, it is possible here for the corresponding edge to be identified in the 3D model. The 3D model can also be used to identify edges.

According to a further embodiment of the method, incomplete edges are ascertained as part of the edge measurement functionality, wherein an edge is ascertained as being an incomplete edge if no end point or only one end point of said edge is imaged in the first and/or second image.

Incomplete edges can be highlighted graphically in the image representation of the scene in a different manner than complete edges, whose two end points are imaged in at least one of the recorded images (e.g. in the first and/or second image for a stereoscopic recording).

If desired, lengths for incomplete edges are either not ascertained at all, or are at least not displayed without user intervention so as to avoid confusion in the user.

According to a further embodiment of the method, an input request is displayed on the display unit together with the image representation of the scene, wherein the input request contains a request for a user to mark a region of the image representation in which edges are to be identified.

In another embodiment, the method comprises an identifying of surfaces in the images, and a marking of the identified surfaces in the image representation of the scene. Here, values for the surface contents of the identified surfaces can be automatically calculated and displayed in the image representation of the scene, in particular without further user intervention.

In an embodiment, the surfaces are identified on the basis of a plurality of edges (for example four edges), which enclose the surfaces. A length of the edges or a perimeter of the surface can optionally be calculated automatically and be displayed in the image representation of the scene, in particular without further user intervention.

In another embodiment, the surfaces are identified on the basis of typical dimensions and/or patterns, in particular wherein the surfaces are assigned to windows or doors in the scene and have dimensions that are typical of windows or doors.

In a further embodiment, the surfaces are identified by way of an adaptive algorithm.

In accordance with a further embodiment of the method, the image representation of the scene is based on at least one of the recorded images of the scene, which are also evaluated photogrammetrically.

A second aspect of some embodiments of the invention relate to a portable apparatus for an image-based measurement of a scene, in particular in accordance with a method of the first aspect of the invention. The apparatus has a housing with a front side and a rear side, at least one camera for recording images of the scene, a control unit for effecting a recording of images of the scene, an evaluation unit with an algorithm for photogrammetric evaluation of the images, and a display unit, which is arranged on the front side, for displaying an image representation of the scene. According to the invention, the evaluation unit includes an algorithm for performing an automatically proceeding edge measurement functionality, as part of which the evaluation unit is configured to identify, in each case without user intervention, edges in the scene on the basis of the images of the scene and to ascertain edge lengths of the identified edges based on the photogrammetrically evaluated images. The control unit is configured here to enable the ascertained edge lengths to be displayed on the display unit as values in the image representation.

In one embodiment, the apparatus according to the invention is configured as a stereo-photogrammetry apparatus and has a first camera and a second camera for recording images of the scene, wherein the cameras are arranged on the rear side with a fixed distance from one another. The control unit is accordingly configured to effect a stereoscopic recording of images of the scene with a recording of a first image using the first camera and of a second image using the second camera, and the evaluation unit includes an algorithm for stereo-photogrammetrically evaluating the first image and the second image.

In a further embodiment, the apparatus according to the invention has a laser rangefinder, wherein the control unit is configured for effecting a measurement of a distance from a surface of the scene using the laser rangefinder, in particular at the same time as the recording of the at least one image, and the evaluation unit is configured to take into account the distance during the (stereo-)photogrammetric evaluation.

In another embodiment, the apparatus according to the invention has a storage unit for storing image data of the first and second camera, coordinates of end points of identified edges, and the values for the edge lengths.

In a further embodiment, the apparatus according to the invention has a touchscreen as the display unit, wherein the control unit is configured to enable an input request to be displayed on the display unit together with the image representation of the scene, in particular wherein the input request contains a request for a user to mark a region of the image representation in which edges are to be identified.

A further aspect of some embodiments of the invention relate to a computer program product with program code, stored on a machine-readable carrier, for performing a method for the image-based measurement of a scene using a handheld apparatus, in particular for performing the method in accordance with the first aspect, wherein the program is executed in a computation unit of the apparatus, in particular in accordance with the second aspect, and includes at least:

a recording of at least one first and one second image of the scene by at least one camera of the apparatus, a photogrammetric evaluating of the first and the second image, a graphic outputting of an image representation of the scene on a display unit, and an automatically proceeding edge measurement functionality, as part of which, in each case without user intervention, edges in the scene are identified utilizing the images of the scene, edge lengths of the identified edges are ascertained based on the photogrammetrically evaluated images, and the ascertained edge lengths are displayed in the image representation of the scene.

BRIEF DESCRIPTION OF THE DRAWINGS

The apparatus according to the invention and the method according to the invention will be described in more detail purely by way of examples below with reference to concrete exemplary embodiments, which are illustrated in the drawings, wherein further advantages of the invention will also be discussed. In detail.

DETAILED DESCRIPTION

Figure 1A:
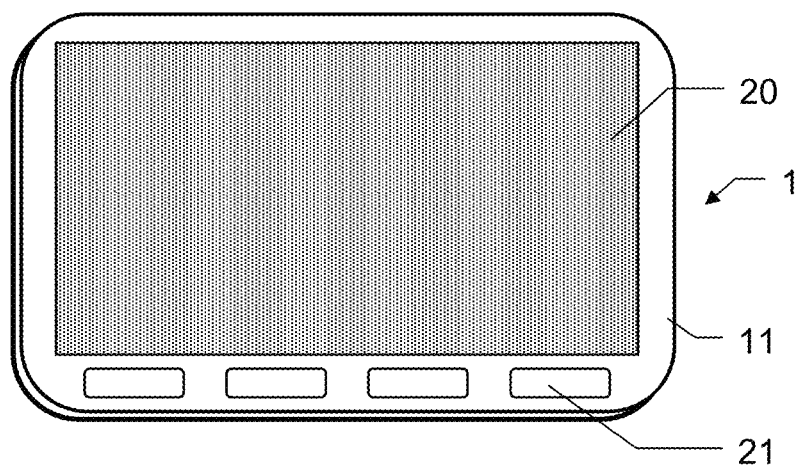
FIGS. 1a-d show exemplary embodiments of a handheld photogrammetry apparatus according to the invention.
Figure 1B:
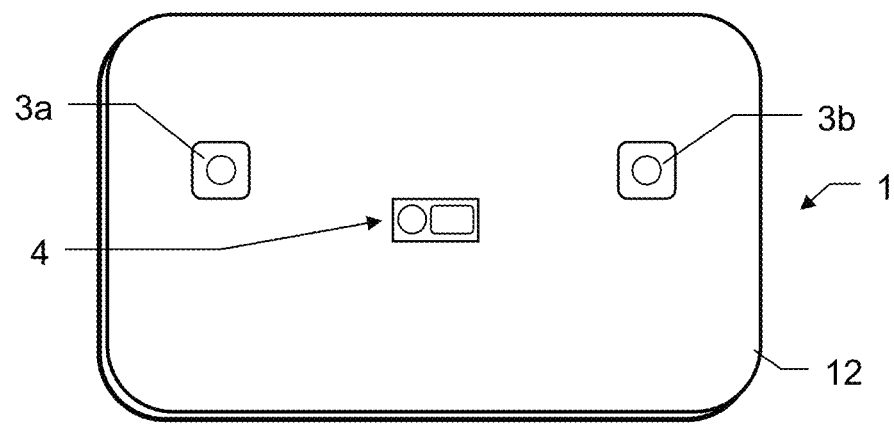
Figure 1C:
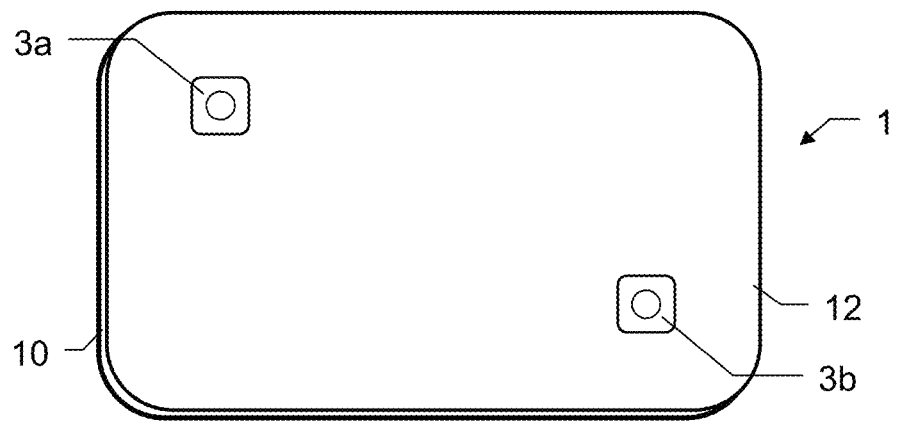
Figure 1D:
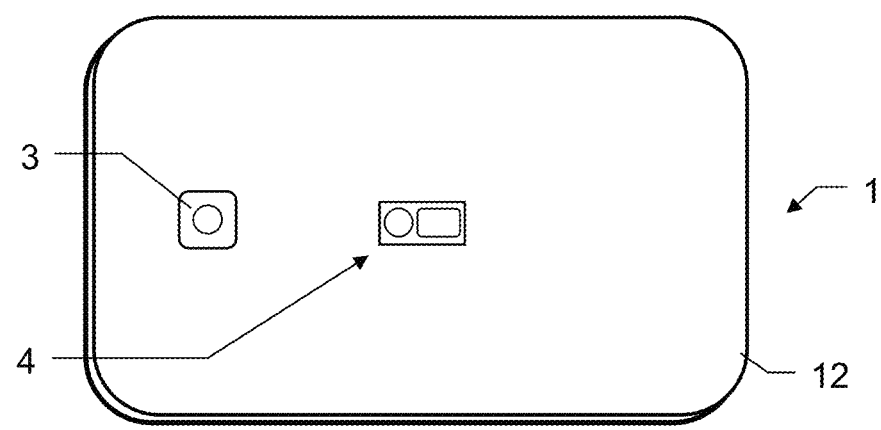

FIGS. 1a to 1d show exemplary embodiments of a photogrammetry apparatus 1 according to the invention. FIG. 1a shows an exemplary front side 11 with a display unit 20 and buttons 21 for operating the apparatus 1, and FIGS. 1b, 1c and 1d show three exemplary embodiments of a camera arrangement on the rear side 12 of the photogrammetry apparatus 1.

In FIGS. 1b and 1c, the apparatus is embodied in the form of a stereo-photogrammetry apparatus 1 having in each case two cameras 3a and 3b. The cameras 3a, 3b are arranged with a fixed stereo base with respect to one another.

In FIG. 1b, the stereo base is parallel with respect to a longitudinal axis of the apparatus; that means that the cameras 3a, 3b are arranged one next to the other at the same height of the housing. In FIG. 1c, the stereo base is diagonal with respect to the longitudinal axis, that is to say the cameras 3a, 3b are arranged with an offset. The latter arrangement is particularly advantageous for measuring buildings and is described in more detail in the patent application EP17202630.4.

A distance captured using the laser rangefinder 4 that is shown byway of example in FIG. 1*b*, can be used in particular for scaling the images recorded by the cameras 3*a*, 3*b*, which increases the accuracy of photogrammetric measurements. As regards internal components (not illustrated here), the apparatus 1 has a storage component for storing image and measurement data and a computation component with a control and evaluation unit. The control unit is configured in particular to control a stereoscopic image recording and a simultaneous distance measurement performed by the cameras 3*a*, 3*b* and the rangefinder 4, and the display of image and measurement data on the display unit 20. The evaluation unit includes algorithms both for edge detection in the camera images and for stereo-photogrammetric evaluation of the camera images.

FIG. 1*d* shows a corresponding photogrammetry apparatus 1, which has, in contrast to those shown in FIGS. 1*b* and 1*c*, only a single camera 3 in addition to a laser rangefinder 4. The apparatus 1 of FIG. 1*d* also has a storage component for storing image and measurement data and a computation component with a control and evaluation unit. The control unit is configured in particular to control an image recording performed by the camera 3 and a simultaneous distance measurement performed by the rangefinder 4, and the display of image and measurement data on the display unit 20. The evaluation unit includes algorithms both for edge detection in the camera images and for photogrammetric evaluation of the camera images.

Figure 2:
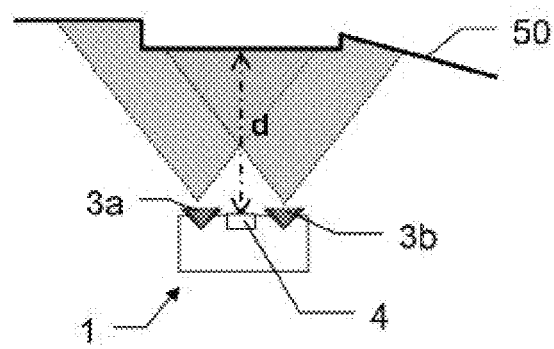
FIG. 2 shows a recording of an image using a stereo-photogrammetry apparatus according to the invention.

FIG. 2 schematically illustrates the principle of stereoscopic recording using the apparatus 1 from FIGS. 1*a-c*. Here, the first camera 3*a* and the second camera 3*b* substantially simultaneously record an image. It is possible in a known manner using the stereoscopically recorded images to measure the scene stereo-photogrammetrically. In addition it is possible using a laser rangefinder 4 of the apparatus 1—in a temporal connection with the image recordings—to measure a distance d from a surface 50 of the scene. This distance d can be used in particular for scaling stereo-photogrammetrically measured dimensions.

Figure 3:
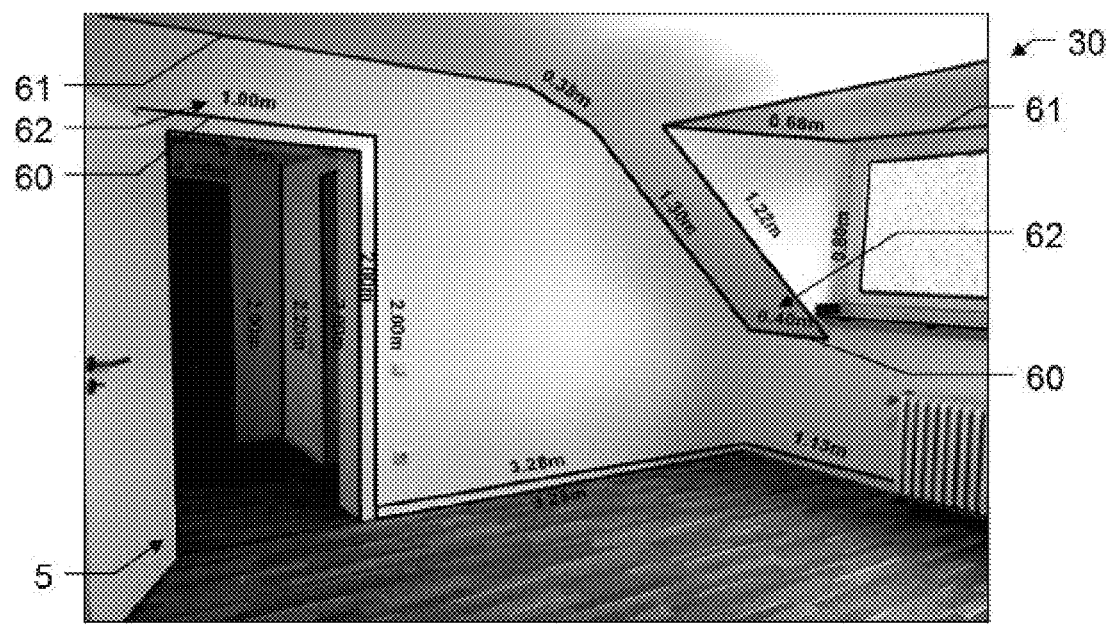
FIG. 3 shows an exemplary display of an image of a scene on a display unit of a stereo-photogrammetry apparatus according to the invention.

FIG. 3 shows an image representation 30 of an exemplary scene 5, which has been recorded by the apparatus and is displayed on the display unit 20. The image representation can be based in particular on one or both camera images.

By way of edge extraction or edge detection, a number of edges 60, 61 are identifiable in the 2D images of the two cameras 3*a*, 3*b*. The respective length of said edges 60, 61 is ascertainable on the basis of the stereoscopic recording of the images using stereo-photogrammetry.

In the image 30 of the scene 5, which is displayed on the display unit 20, all identified edges 60, 61 are automatically optically highlighted for a user for improved recognizability. This can be accomplished, in particular, by way of colored marking.

Edges 60, which are situated entirely in the image 30 and whose respective length is therefore measurable photogrammetrically, are additionally provided with a length specification 62, which corresponds to the ascertained length of the relevant edge 60. For measuring an ascertained edge 60, points on or at the respective edge 60 in the image 30 can be measured stereo-photogrammetrically (in particular edge end points), as a result of which a 3D model of the edge 60 is derivable, whose length is determinable in this way.

For edges 61, which are only partially located within the image 30, that is to say those edges that extend beyond the periphery of the recorded images, the entire length is not ascertainable. While it is possible to photogrammetrically ascertain the length of that part of the edge 61 that is located within the image 30, this information is generally useless and is therefore not illustrated as standard. If desired, it is of course possible to give the user the option of having said edges 61 displayed with a length specification for the partial length that is located within the image 30. The edges 61, which are located only partly within the image, can be accentuated for example in a different color than edges 60 that are located entirely within the image 30.

Figure 4:
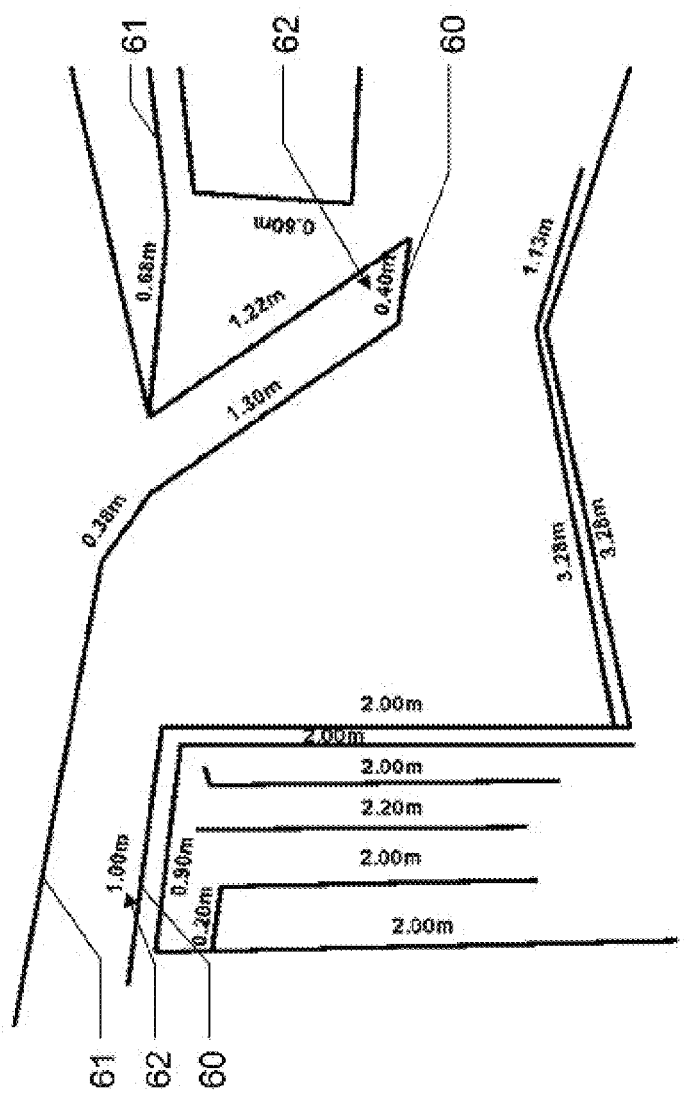
FIG. 4 shows contents additionally displayed in the display from FIG. 3.

For clarification purposes, FIG. 4 shows the optical highlighting of the identified edges 60, 61, which was added to the image 30 of the scene 5 from FIG. 3, and the ascertained length specifications 62 (without the image itself). Overlaying the image with the edges 60, 61 and length specifications 62 can be advantageously accomplished after the recording of the images without any further user intervention, i.e. automatically. The measurement results can preferably be storable and exportable. Additional measurements can be performed in the image in a known manner.

If desired, it is possible in principle to create a 3D model of the scene, wherein the edge measurement is made on the 3D model. To this end, the edges 60, 61, which were identified in the 2D images, are matched to the corresponding edges in the 3D model. It is likewise possible for edges to be found and measured in the 3D model using 3D information provided by the model and to then be transferred to a 2D image.

The relationship between 2D images and 3D model is determined photogrammetrically, as a result of which the spatial extent of the image representations of the edges that are two-dimensional in the images is ascertainable.

Alternatively, only the end points of the edges 60, 61 in the camera images are identified. Subsequently, 3D coordinates of the end points can be determined by way of stereo-photogrammetry. The 3D distance between the end points corresponds to the edge length.

The geometry of the 3D model can assist in selecting the edges of interest. For example, it is possible for only edges that are not located in a specific plane to be displayed, or for a machine learning algorithm to be used to find all windows in the image using depth information.

Differentiating between the identified edges 60, 61 in terms of complete edges 60 and incomplete edges 61 can also be accomplished by way of an identification of the end points. If an edge terminates at the image periphery or outside a region that is stereo-photogrammetrically evaluable, it is an incomplete edge 61, whose entire length is not ascertainable, or is not ascertainable without taking additional steps.

Figure 5:
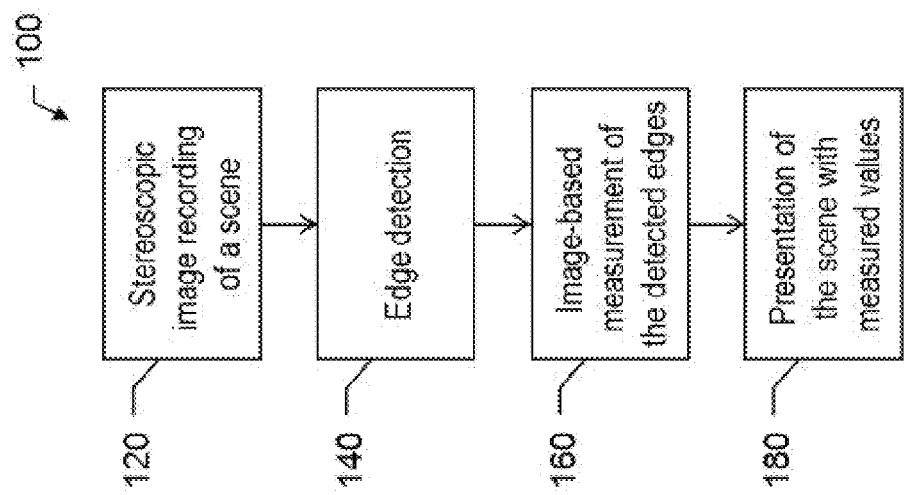
FIG. 5 shows a flow chart for illustrating an exemplary embodiment of the method according to the invention.

FIG. 5 illustrates by way of a flowchart an exemplary embodiment of the method 100 according to the invention. First, the user directs the apparatus to the scene that is to be recorded and triggers a stereoscopic image recording 120 using the two digital cameras of the apparatus. The image data obtained can be stored preferably in a storage unit of the apparatus. Alternatively, two recordings can be made using an apparatus having only one camera (cf. FIG. 1*d*).

Edges in the scene are identified by way of edge detection 140 on the basis of at least one of the images. Different algorithms and operators can be used herefor, e.g. Sobel operator or Canny algorithm.

The images are stereo-photogrammetrically evaluable owing to the stereoscopic image recording 120. Accordingly, image-based measurement 160 of the detected edges is also possible. For example, three-dimensional coordinates can be assigned to the end points of the detected edges, and a distance between two end points of the same edge can be calculated. As long as the edge is straight, the calculated distance between the end points corresponds to the edge length.

Consequently, a presentation 180 of the scene can be presented to a user for example on a display unit of the apparatus or on an external computer monitor, wherein the detected edges can be depicted optically highlighted in the image representation of the scene and the calculated edge lengths can be displayed directly in the image.

Figure 6A:
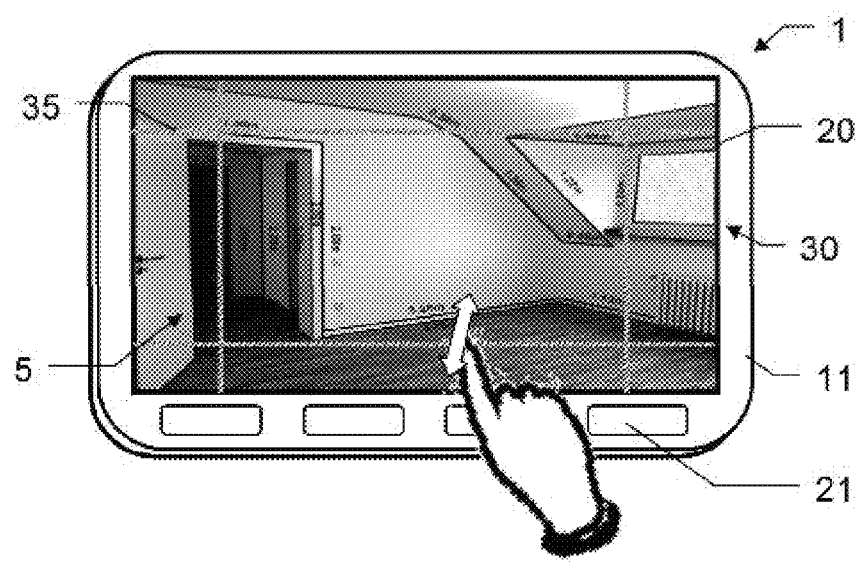
FIGS. 6a-b show exemplary functionalities for the selection of a display region by way of a user.
Figure 6B:
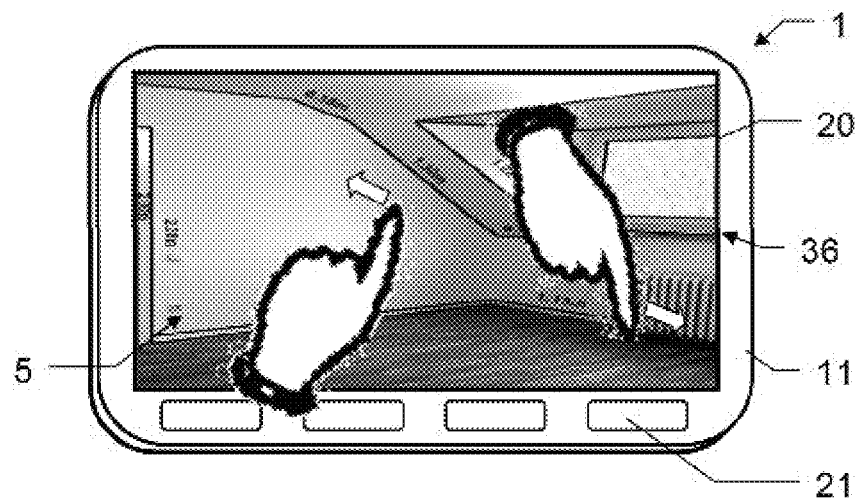

A disadvantage with automatic edge detection is that some edges are easier to detect by the human eye than by algorithms, and moreover, the algorithm does not know which edges are of interest to the user and which are not. In an embodiment of the method according to the invention or of the apparatus according to the invention, the user can therefore define regions in the scene 5 that are of particular interest. Two purely exemplary solutions are shown in FIGS. 6*a* and 6*b*. Illustrated in a respective case is the front side 11 of the apparatus from FIG. 1*a*, wherein the image 30 of the scene 5 from FIG. 3 is depicted on the display unit 20.

In edge detection, the priority typically lies at the center of an image, which is why it is possible as standard to look only at the image center for edges, or only for edges that are at least partially located at the image center. It is in particular possible for the priority to lie with edges which are located centrally in the image and make up approximately 50-90% of the image length; for example the height of the door or the wall length next to the door in FIG. 3. Alternatively, it is also possible to look for edges preferably at the image periphery. This makes particular sense if the image comprises a single wall and its edges.

In FIG. 6*a*, a frame 35 is placed over the image 30 which limits the search region to the image center, but which is adjustable by the user such that a region that is of particular interest is selectable. If the display unit 20 is a touchscreen, as is illustrated here, this can be accomplished by swiping movements (illustrated by arrows) using the user's finger. By displacing the frame 35, the user can displace the search region, or increase or reduce the size thereof.

In that case, either the search for edges is limited to the region selected by the user, or this is where the search for any edges is particularly intensive or where the edge lengths are ascertained with particularly great accuracy.

If desired, the edge detection can also have an adaptive pattern recognition functionality based on machine learning algorithms. The algorithm can learn here which types of edges are typically of interest. This can be accomplished for example using a measurement history of the user or on the basis of data provided by the manufacturer or externally.

FIG. 6*b* shows a zoom functionality. The user can also zoom in on a region 36 of the image after the edges have been represented—for example by way of corresponding swiping movements on the touchscreen 20 using his or her fingers. In this way it is also possible to define the region that is of interest to the user. For example, it is also possible to zoom in on an individual edge that is of interest to the user. Said edge can then be recognized and measured with particular accuracy.

Edges that are to be represented can also be selected via the depth information. For example, the user can limit the depth to the front and back using a slider so as to obtain only edges located in a specific plane that are of interest to him or her. Identified edges which are situated in a background or foreground that is of no interest to the user and might otherwise interfere with the ability to gain an overview are thus not highlighted.

If desired, the user can also mark edges or points in the image. It is possible for example to ascertain a distance of an edge from a point. It is likewise possible for two parallel edges to be marked, whereupon the distance between them is calculated and displayed. This is useful for example if the width of a room is to be ascertained, but the edges toward the ground and toward the ceiling are not displayed in their entirety in the image.

Figure 7A:
FIGS. 7a-b show a recognition and accentuation of patterns in an image of a scene.
Figure 7B:
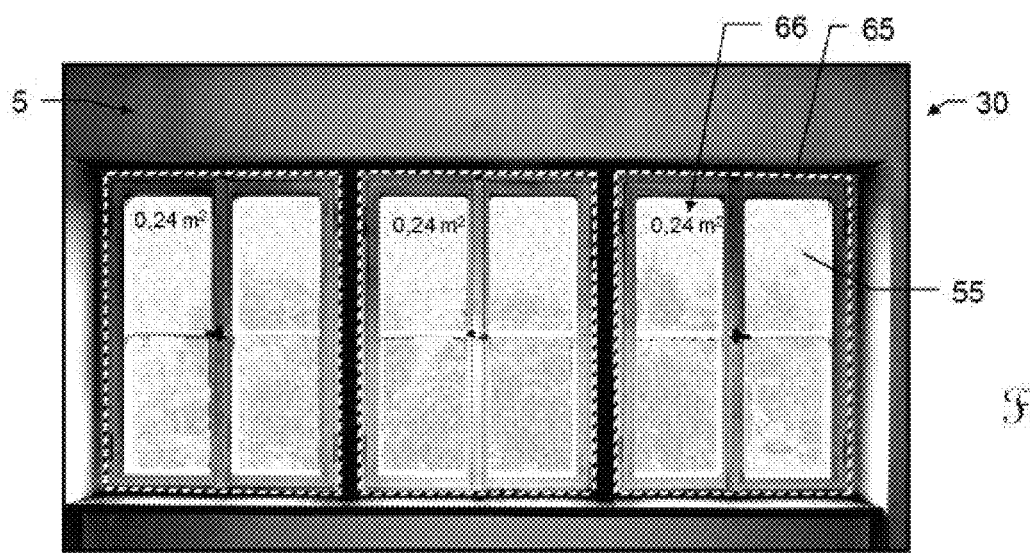

FIGS. 7*a* and 7*b* illustrate a pattern recognition functionality, based on edge detection, of an exemplary embodiment of a photogrammetry apparatus 1 according to the invention. Shown is an image 30 of a scene 5 with three windows 55 as examples of patterns that are recognizable by way of edge detection. Recognizable patterns in this case are in particular typical industrial shapes, such as windows or doors. In FIG. 7*b*, the detected edges 65 of the windows 55 are highlighted. Not only is it possible, as shown in FIG. 3, to specify the edge lengths, but, it is also possible for the surface area enclosed by the edges 65 of the detected patterns to be calculated and output as a value 66 directly in the displayed image 30. This can be effected automatically for all recognized patterns of a scene 5 or as a result of a user selection for specific patterns.

The identification can proceed in particular using an adaptive algorithm that finds the object of interest on the basis of the user history of the apparatus or on the basis of predefined examples which are stored in the device.

It is to be understood that these illustrated figures only schematically illustrate possible exemplary embodiments. The different approaches can be combined with one another and also with methods and devices of the prior art.

What is claimed is:

1. A method for an image-based measurement of a scene using a handheld apparatus, comprising:
    a recording of at least one first image and one second image of the scene by at least one camera of the apparatus, wherein the first image and the second image have an overlapping image region;
    a photogrammetric evaluating of the first and the second image;
    a graphic outputting of an image representation of the scene on a display unit;
    automatically performing a proceeding edge measurement, as part of which, in each case without user intervention, edges in the scene are identified utilizing the first and the second image of the scene, edge lengths of the identified edges are ascertained based on the photogrammetrically evaluated images, and the ascertained edge lengths are displayed in the image representation of the scene.

2. The method according to claim 1, wherein edges, which are identified as part of the edge measurement functionality, are graphically highlighted in the image representation of the scene.

3. The method according to claim 1, further comprising:
    a stereoscopic recording of the first image of the scene by a first camera of the apparatus and of the second image of the scene by a second camera of the apparatus, and
    a stereo-photogrammetric evaluating of the first and the second image,
    wherein
    edges in the scene are identified utilizing the images of the scene, and edge lengths of the identified edges are ascertained based on the stereo-photogrammetrically evaluated images.

4. The method according to claim 1, further comprising measuring a distance to a surface of the scene, wherein the distance is taken into account during the photogrammetric evaluation.

5. The method according to claim 1, wherein ascertaining of the length of an edge comprises:
   a. identifying two end points of the edge, and
   b. ascertaining a distance between the two end points using photogrammetry.

6. The method according to claim 1, wherein the photogrammetric evaluating of the first and of the second image comprises a generating of a 3D model of the scene, wherein
   a. the 3D model is used to identify the edge, or,
   b. for ascertaining the length of an edge that has been identified in the images, the corresponding edge is identified in the 3D model.

7. The method according to claim 1, wherein:
   as part of the edge measurement functionality, incomplete edges are ascertained, wherein an edge is ascertained as being an incomplete edge if no end point or only one end point of said edge is imaged in the first or second image.

8. The method according to claim 1, further comprising displaying an input request on the display unit together with the image representation of the scene, wherein the input request contains a request for a user to mark a region of the image representation in which edges are to be identified.

9. The method according to claim 1, further comprising:
   identifying surfaces in the images; and
   marking the identified surfaces in the image representation of the scene.

10. A portable apparatus for image-based measurement of a scene, the portable apparatus comprising:
    a. a housing with a front side and a rear side;
    b. at least one camera for recording images of the scene;
    c. a control unit for effecting a recording of images of the scene;
    d. an evaluation unit with an algorithm for photogrammetric evaluation of the images; and
    e. a display unit, which is arranged on the front side, for displaying an image representation of the scene,
    wherein the evaluation unit includes an algorithm for performing an automatically proceeding edge measurement functionality, as part of which the evaluation unit is configured, in each case without user intervention,
    f to identify edges in the scene on the basis of the images of the scene, and
    g. to ascertain edge lengths of the identified edges based on the photogrammetrically evaluated images, and
    wherein the control unit is configured to enable the ascertained edge lengths to be displayed on the display unit as values in the image representation of the scene.

11. The apparatus according to claim 10, further comprising:
    a first camera and a second camera for recording images of the scene, wherein the cameras are arranged on the rear side with a fixed distance from one another, wherein:
    a. the control unit is configured to effect a stereoscopic recording of images of the scene with a recording of a first image using the first camera and of a second image using the second camera; and
    b. the evaluation unit includes an algorithm for stereo-photogrammetrically evaluating the first image and the second image.

12. The apparatus according to claim 10, further comprising:
    a laser rangefinder, wherein:
    a. the control unit is configured for effecting a measurement of a distance (d) from a surface of the scene using the laser rangefinder; and
    b. the evaluation unit is configured to take into account the distance (d) during the photogrammetric evaluation.

13. The apparatus according to claim 10, further comprising:
    a storage unit for storing:
    a. image data of the at least one camera,
    b. coordinates of end points of identified edges, and
    c. the values for the lengths of the edges.

14. The apparatus according to claim 10, further comprising:
    a touchscreen as the display unit, wherein the control unit is configured to enable an input request to be displayed on the display unit together with the image representation of the scene.

15. A computer program product with program code, which is stored on a non-transitory tangible machine-readable carrier, for performing a method for an image-based measurement of a scene using a handheld apparatus, wherein the program is executed in a computation unit of the apparatus to cause the apparatus to perform a method comprising:
    a. recording of at least one first image of the scene by at least one camera of the apparatus;
    b. performing a photogrammetric evaluation of the first image;
    c. graphically outputting of an image representation of the scene on a display unit; and
    d. performing an automatic proceeding edge measurement, as part of which, in each case without user intervention,
       edges in the scene are identified utilizing the at least one image of the scene,
       edge lengths of the identified edges are ascertained based on the photogrammetrically evaluated images, and
       the ascertained edge lengths are displayed in the image representation of the scene.

* * * * *